(12) United States Patent
Li et al.

(10) Patent No.: US 10,867,620 B2
(45) Date of Patent: Dec. 15, 2020

(54) SIBILANCE DETECTION AND MITIGATION

(71) Applicant: Dolby Laboratories Licensing Corporation, San Francisco, CA (US)

(72) Inventors: Kai Li, Beijing (CN); David Gunawan, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 52 days.

(21) Appl. No.: 15/627,114

(22) Filed: Jun. 19, 2017

(65) Prior Publication Data
US 2017/0372719 A1   Dec. 28, 2017

Related U.S. Application Data

(60) Provisional application No. 62/353,213, filed on Jun. 22, 2016.

(51) Int. Cl.
| | | |
|---|---|---|
| G10L 15/02 | (2006.01) | |
| G10L 21/02 | (2013.01) | |
| G10L 25/21 | (2013.01) | |
| G10L 25/18 | (2013.01) | |
| G10L 25/84 | (2013.01) | |
| G10L 21/0364 | (2013.01) | |
| G10L 21/0208 | (2013.01) | |
| G10L 25/48 | (2013.01) | |

(52) U.S. Cl.
CPC ............. *G10L 25/21* (2013.01); *G10L 15/02* (2013.01); *G10L 21/0208* (2013.01); *G10L 21/0364* (2013.01); *G10L 25/18* (2013.01); *G10L 25/48* (2013.01); *G10L 25/84* (2013.01); *G10L 2021/03646* (2013.01)

(58) Field of Classification Search
CPC .................................. G10L 21/02; G10L 19/02
USPC .......................... 704/206, 268; 381/28, 94.7
See application file for complete search history.

(56) References Cited

U.S. PATENT DOCUMENTS 4,630,300 A * 12/1986 Kang ...................... H04B 1/66
704/205
4,696,040 A    9/1987 Doddington
(Continued)

FOREIGN PATENT DOCUMENTS

| CA | 1157953 | 11/1983 |
|---|---|---|
| WO | 2015/035492 | 3/2015 |
| WO | 2015/130283 | 9/2015 |

OTHER PUBLICATIONS

Wikipedia, "Sibilant" https://en.wikipedia.org/wiki/Sibilant.
(Continued)

*Primary Examiner* — Seong-Ah A Shin

(57) ABSTRACT

The present disclosure relates to sibilance detection and mitigation in a voice signal. A method of sibilance detection and mitigation is described. In the method, a predetermined spectrum feature is extracted from a voice signal, the predetermined spectrum feature representing a distribution of signal energy over a voice frequency band. Sibilance is then identified based on the predetermined spectrum feature. Excessive sibilance is further identified from the identified sibilance based on a level of the identified sibilance. Then the voice signal is processed by decreasing a level of the excessive sibilance so as to suppress the excessive sibilance. Corresponding system and computer program products are described as well.

19 Claims, 9 Drawing Sheets

(56) References Cited

U.S. PATENT DOCUMENTS

| | | | | |
|---|---|---|---|---|
| 5,263,087 | A * | 11/1993 | Fosgate | H04S 5/005 |
| | | | | 381/22 |
| 5,574,791 | A | 11/1996 | Orban | |
| 6,373,953 | B1 * | 4/2002 | Flaks | G10L 21/02 |
| | | | | 381/57 |
| 8,032,366 | B2 | 10/2011 | Mapes-Riordan | |
| 8,229,106 | B2 | 7/2012 | Greiss | |
| 8,831,958 | B2 | 9/2014 | Lee | |
| 9,066,177 | B2 | 6/2015 | Sandgren | |
| 2002/0120440 | A1 * | 8/2002 | Zhang | G10L 25/78 |
| | | | | 704/215 |
| 2004/0138876 | A1 * | 7/2004 | Kallio | G10L 21/038 |
| | | | | 704/209 |
| 2006/0239472 | A1 | 10/2006 | Oda | |
| 2007/0238490 | A1 * | 10/2007 | Myrberg | H04M 1/6066 |
| | | | | 455/569.1 |
| 2009/0287480 | A1 * | 11/2009 | Mapes-Riordan | G10L 19/26 |
| | | | | 704/225 |
| 2012/0243702 | A1 | 9/2012 | Sandgren | |
| 2014/0288938 | A1 * | 9/2014 | Kong | G10L 21/003 |
| | | | | 704/268 |
| 2015/0238562 | A1 * | 8/2015 | Su | C07K 7/64 |
| | | | | 514/6.9 |
| 2015/0248889 | A1 * | 9/2015 | Dickins | G10L 19/012 |
| | | | | 704/500 |
| 2015/0348562 | A1 * | 12/2015 | Krishnaswamy | G10L 21/0264 |
| | | | | 704/206 |
| 2015/0356978 | A1 | 12/2015 | Dickins | |
| 2015/0371653 | A1 * | 12/2015 | Pilli | G10L 19/26 |
| | | | | 704/206 |
| 2016/0165361 | A1 * | 6/2016 | Miller | H04R 25/48 |
| | | | | 381/317 |
| 2016/0189707 | A1 * | 6/2016 | Donjon | H04W 88/02 |
| | | | | 704/205 |
| 2018/0295240 | A1 * | 10/2018 | Dickins | H04M 3/42221 |

OTHER PUBLICATIONS

Wolters, M. et al "Adaptive Algorithm for Detecting and Reducing Sibilants in Recorded Speech" 104 AES May 1, 1998, pp. 1-9.
Lemanski, Joseph B. "A New Vocal De-Esser" May 1, 1981, 69 AES, pp. 1-15.
Model 263X Harman, May 1, 1991, pp. 1-46.
Schlette, Rob, "Tips for Controlling Vocal Sibilance" Mar. 2012.

* cited by examiner

SIBILANCE DETECTION AND MITIGATION

CROSS-REFERENCE TO RELATED APPLICATION(S)

The present application claims priority to U.S. Provisional Patent Application No. 62/353,213, filed Jun. 22, 2016, which is incorporated herein by reference in its entirety.

TECHNOLOGY

Embodiments of the present disclosure generally relate to voice signal processing, and more specifically, to sibilance detection and mitigation.

BACKGROUND

Sibilance refers to a voice having a strongly emphasized sound like consonants such as s, sh, ch, z, v, f, etc. in a speech. These consonants are created by air moving through the vocal tract and being constricted by the position of the tongue and lips. The sibilance commonly appears in a scenario containing voice information, such as voice communication like a voice call and teleconference, voice broadcasting, music playing, etc. The sibilance normally lies in the frequency between 4 KHz-10 KHz, depending on individuals. However, if the energy of the sibilance voice is too high, a user might experience unnatural harshness since the strong and excessive sibilance voice degrades the user experience.

Excessive sibilance might be caused by various reasons. For example, an electroacoustic device (such as a speaker, microphone, headset, etc.) with a low quality might render unpleased sibilance due to bad frequency responses. In addition, over-boosting of frequency might cause excessive sibilance as well. Moreover, if a vocal is over compressed or incorrectly compressed, it might cause excessive sibilance too. A talker who has sibilant voice style may also cause an excessive sibilance.

The presence of excessive sibilance degrades the quality of voice signal and in turn degrades the user experience, and therefore in the art, there is a need for a solution for sibilance detection and mitigation.

SUMMARY

In view of the above, the present disclosure provides a solution for sibilance detection and mitigation.

In one aspect, an example embodiment of the present disclosure provides a method of sibilance detection and mitigation. In the method, a predetermined spectrum feature is extracted from a voice signal, the predetermined spectrum feature representing a distribution of signal energy over a voice frequency band. Sibilance is then identified based on the predetermined spectrum feature. Excessive sibilance is further identified from the identified sibilance based on a level of the identified sibilance. Then the voice signal is processed by decreasing a level of the excessive sibilance so as to suppress the excessive sibilance.

In example embodiments, the method may further comprise determining a ratio of the level of the identified sibilance to a long-term level of non-sibilance voices. Then, the identifying excessive sibilance based on a level of the identified sibilance may comprise determining whether the identified sibilance is excessive sibilance based on the ratio.

In example embodiments, the method may further comprise determining a peaky degree of a sibilance spectrum based on banded energies in a sibilance frequency band. Then, the identifying excessive sibilance based on a level of the identified sibilance may comprise determining whether the identified sibilance is excessive sibilance based on the peaky degree.

In some example embodiments, the method may comprise determining both said ratio and said peaky degree. Then, the identifying excessive sibilance based on a level of the identified sibilance may comprise determining whether the identified sibilance is excessive sibilance based on said ratio and said peaky degree.

In example embodiments, the processing the voice signal may comprise processing the voice signal according to a sibilance suppression curve. The sibilance may be suppressed by a predetermined suppression amount when its level is higher than a predetermined level threshold. The method may further comprise any (or both) of: determining a ratio of the level of the identified sibilance to a long-term level of non-sibilance voices, and determining a peaky degree of a sibilance spectrum based on banded energies in a sibilance frequency band. The method may further comprise controlling an operating mode in which the sibilance is suppressed, based on any (or both) of the ratio and the peaky degree. The controlling an operating mode in which the sibilance is suppressed may comprise any (or both) of: adjusting the predetermined suppression amount, and adjusting the predetermined suppression amount and the other predetermined level threshold.

Thus, in some example embodiments, the method may comprise determining said ratio, and controlling said operating mode based on said ratio.

In some other example embodiments, the method may comprise determining said peaky degree, and controlling said operating mode based on said peaky degree.

In another aspect, another example embodiment of the present disclosure provides a system of sibilance detection and mitigation. The system includes a feature extractor, a sibilance identifier, an excessive sibilance identifier, and a sibilance suppressor. The feature extractor is configured to extract a predetermined spectrum feature representing a distribution of signal energy over a voice frequency band from a voice signal. The sibilance identifier is configured to identify sibilance based on the predetermined spectrum feature. The excessive sibilance identifier is configured to identify excessive sibilance based on a level of the identified sibilance. The sibilance suppressor is configured to process the voice signal by decreasing a level of the excessive sibilance so as to suppress the excessive sibilance.

In a further aspect, a further example embodiment of the present disclosure provides a computer program product of sibilance detection and mitigation. The computer program product being tangibly stored on a non-transient computer-readable medium and including machine executable instructions which, when executed, cause the machine to perform steps of the method according to the aspect described above.

Through the following description, it would be appreciated that, in accordance with example embodiments of the present disclosure, the sibilance can be identified based on the predetermined spectrum feature and the excessive sibilance can be further identified based on information on the level of the identified sibilance and thus, the excessive sibilance can be suppressed to make it sound natural.

DESCRIPTION OF DRAWINGS

Through the following detailed description with reference to the accompanying drawings, the above and other objectives, features and advantages of embodiments of the present disclosure will become more comprehensible. In the drawings, several example embodiments of the present disclosure will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
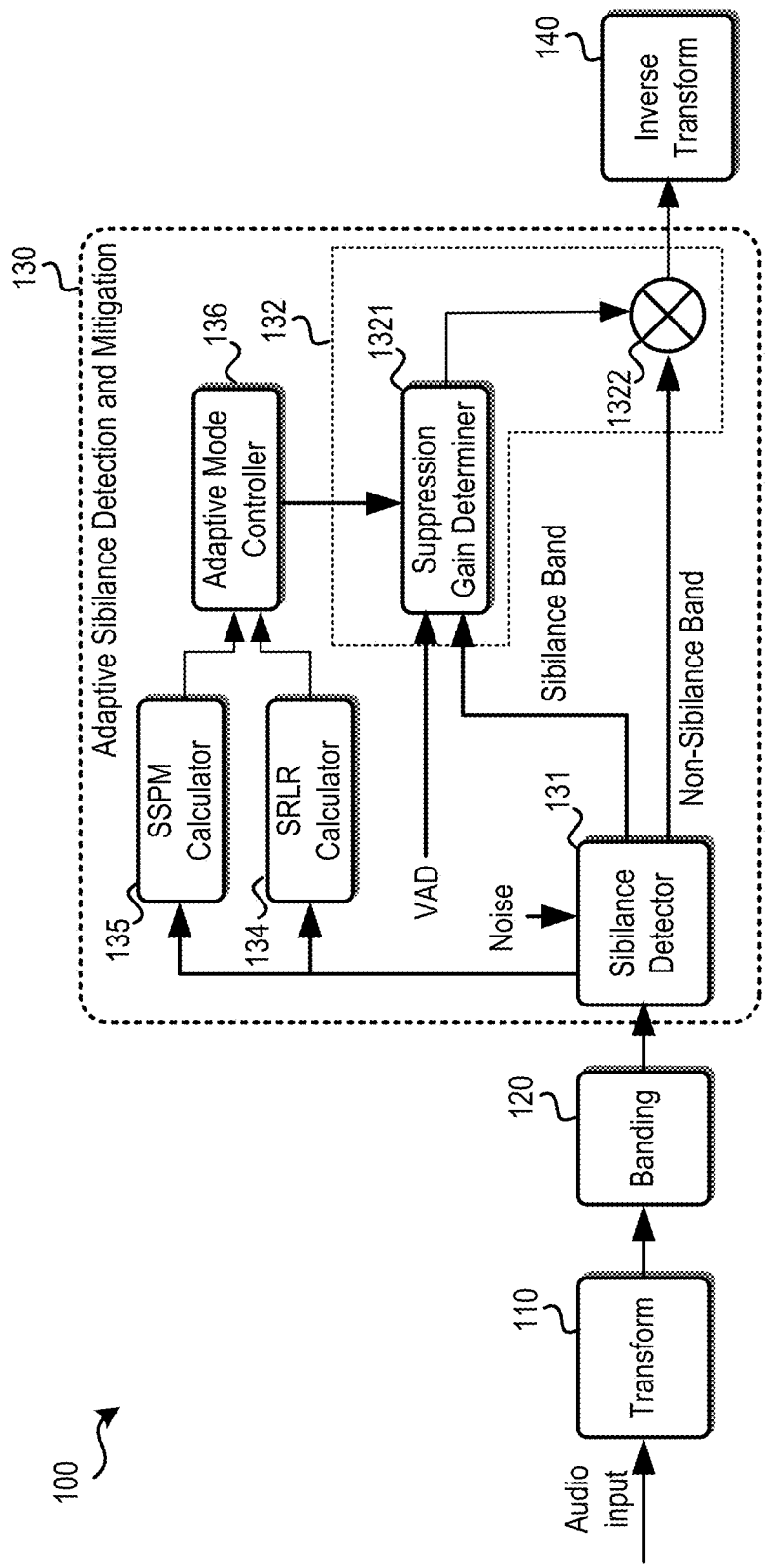
FIG. 1 illustrates a block diagram of an architecture of a system for automatic sibilance management in accordance with an example embodiment of the present disclosure.

Principles of the present disclosure will now be described with reference to various example embodiments illustrated in the drawings. It should be appreciated that depiction of these embodiments is only to enable those skilled in the art to better understand and further implement the present disclosure, not intended for limiting the scope of the present disclosure in any manner.

In the accompanying drawings, various embodiments of the present disclosure are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated software-based or hardware-based system for performing specified functions/operations or by a combination of dedicated hardware and computer instructions.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment". In addition, in the following description and claims, unless defined otherwise, all technical and scientific terms used herein have the same meaning as commonly understood by one of ordinary skills in the art to which this disclosure belongs.

As mentioned hereinabove, the presence of excessive sibilance degrades the quality of voice signal and thus degrades the user experience. In view of this, in embodiments of the present disclosure, there is provided a novel solution of automatic sibilance detection and mitigation. A purpose of the automatic sibilance detection and mitigation is aimed to detect the excessive sibilance and process the excessive sibilance to make it sound natural without harming those non-sibilance voices. In embodiments of the present disclosure, a predetermined spectrum feature representing a distribution of signal energy over a voice frequency band is extracted from the voice signal, based on the predetermined spectrum feature, it is determined whether there is sibilance in the voice signal; then it may identify excessive sibilance from the identified sibilance based on a level of the identified sibilance; once the excessive sibilance is identified, it may decrease a level of the excessive sibilance so as to suppress the excessive sibilance so that it sounds natural. In addition, a sibilance suppression mode in which the sibilance suppression is performed can also be adaptively controlled based on one or more high level perceptual-related sibilance measures to achieve a better sibilance suppression effect.

Hereinafter, reference will be made to FIGS. 1 to 14 to describe some example embodiments of the present disclosure in details. However, it should be appreciated that these descriptions are made only for illustration purposes and the present disclosure is not limited thereto.

Reference is first made to FIG. 1, which shows architecture of a system 100 for automatic sibilance management in accordance with an example embodiment of the present disclosure.

As shown, the system 100 includes a transform module 110 and a banding module 120, an adaptive sibilance detection and mitigation module 130 and an inversion transform module 140.

The transform module 110 is configured to receive an audio input, especially a voice signal, and transform the audio input to a desired transform domain. The term "voice signal" herein means an audio signal that contains voice. However, it does not require the voice signal to contain a voice in each frame, and it is possible contain a silence signal or noise signal in a frame without any voice.

In most cases, the audio input is picked up by a microphone, mounted on a headset or any device like that. Typically, if the microphone has a peaky frequency response or it is placed close to the user's mouth, his/her sibilance voice may be picked up by the microphone with potentially excessive sibilance level that is caused by the air blowing through a narrow orifice or across the cutting edge of the teeth, such as "s", "z" and "sh". The picked-up voice may be fed, as the audio input, into the system 100 in a real time manner, usually in a frame by frame manner for audio processing.

In order to perform the automatic sibilance management, the transform module 110 may conduct a transform to convert the audio signal to the desired transform domain. For example, the transform module 110 may perform a Fourier Transform or Modified Discrete Cosine Transform (MDCT) to transform the voice signal, for example from the time domain to a voice signal in a frequency domain.

After that, the banding module 120 will perform a banding operation and divide a voice frequency band into a plurality of sub-bands. The term "a voice frequency band" used herein means a frequency band in which a voice signal is located, and for example ranges from 0 KHz to 16 KHz. The voice frequency band is further divided into a plurality of sub-bands for further processing.

The adaptive sibilance detection and mitigation module 130, as the key part of the solution of sibilance detection and mitigation, is configured to detect sibilance and excessive sibilance in the current frame and process excessive sibilance to make it sound natural. The adaptive sibilance detection and mitigation module 130 will also use the perceptual related sibilance measures such as SSPM and SRLR to perform an adaptive mode control of the sibilance suppression. The inner modules of the adaptive sibilance detection and mitigation module 130 will be described hereinafter and thus will not be elaborated herein.

Then, the voice signal is received by the inverse transform module 140 and the voice signal is transformed back to the original domain. For example, the inverse transform module 140 can perform an Inverse Fourier Transform (IFT) to convert the processed signal from the frequency domain to the time domain.

As illustrated in FIG. 1, the adaptive sibilance detection and mitigation module 130 may further include a sibilance detector 131, a sibilance suppressor 132, a Sibilance to long-term non-sibilance Relative Level Ratio (SRLR) calculator 134, a Sibilance Spectral Peaky Measure (SSPM) calculator 135 and an adaptive module controller 136. The sibilance detector 131 is configured to detect the sibilance from the input voice signal. The sibilance suppressor 132 is configured to process the voice signal by decreasing a level of the excessive sibilance so as to suppress the excessive sibilance. The sibilance suppressor 132 may include a suppression gain determination module 1321 configured to determine the suppression gain for the voice signal and a suppression gain module 1322 configured to apply the suppression on the voice according to the determined suppression gain. The SRLR calculator 134 is configured to obtain the value of the SRLR and the SSPM calculator 135 is configured to obtain the values of the SSPM. The values of the SRLR and the SSRM can be used by the adaptive mode controller 136 to control the mode in which the sibilance suppressor 132 performs the suppression. Hereinafter, these modules will be described in details with reference to FIGS. 2 to 13.

Figure 2:
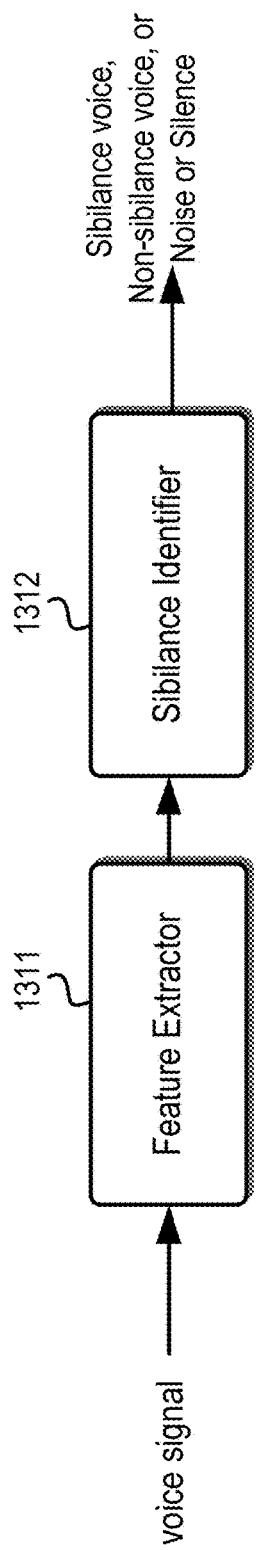
FIG. 2 illustrates a diagram of blocks in the sibilance detector in accordance with an example embodiment of the present disclosure.

FIG. 2 illustrates a diagram of blocks in the sibilance detector 130 in accordance with an example embodiment of the present disclosure. As illustrated in FIG. 2, the sibilance detector 131 may include a feature extractor 1311 and a sibilance identifier 1312. The sibilance extractor 1311 is configured to extract a predetermined spectrum feature from the voice signal, wherein the predetermined spectrum feature represents a distribution of signal energy over a voice frequency band. The sibilance identifier 1312 is configured to identify sibilance based on the predetermined spectrum feature.

During operations of the feature extractor 1311, the input audio is transformed to one or more spaces and one or more different spectrum features can be calculated and the one or more features are chosen to mainly differentiate the sibilance voice from non-sibilance voice.

Figure 3:
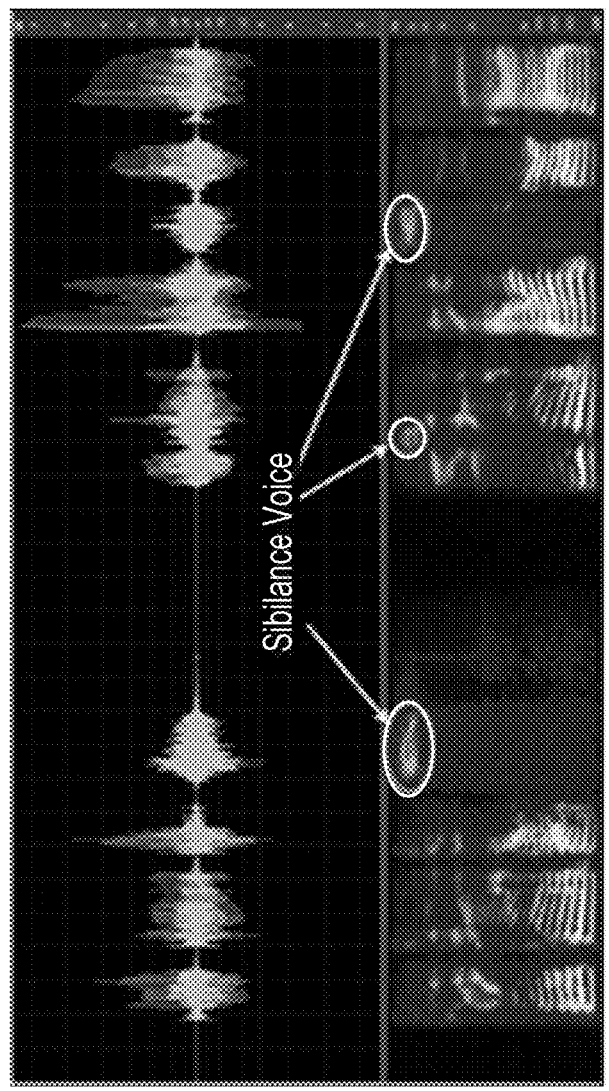
FIG. 3 illustrates a diagram of a spectrum of an example sibilance voice.

For illustrative purposes, FIG. 3 illustrates a diagram of a spectrum of an example sibilance voice in the frequency domain. As illustrated in FIG. 3, it can be seen that the sibilance voice usually is concentrated on a certain frequency band and such a frequency band can be called as a sibilance frequency band. In other words, the sibilance frequency band is that frequency band which the energy of the sibilance is expected to be concentrated in. The sibilance frequency band is usually ranging from 4 KHz to 10 Hz. For example, the sibilance frequency band may include all frequencies in the voice frequency band that are above 4 KHz. In other words, the sibilance has a rather high signal energy over the sibilance frequency band, while has a very low signal energy over the non-sibilance frequency band. Thus, based on the predetermined spectrum feature representing a distribution of signal energy over a voice frequency band, it is possible to identify the sibilance voice.

Hereinafter, several example features which can be used to detect the sibilance are described for illustrative purposes. The example features include spectral balance features, a spectral centroid feature, a sibilance spectral flux feature. However, it shall be noticed that these are only described for illustrative purposes and that the present disclosure is not limited thereto. In addition, it shall be noticed that in the following embodiments, it is assumed that the audio signal is first transformed into the frequency domain and all of the features are calculated based on the frequency domain audio signal. Meanwhile, it should also be noted that vectors are written in bold to differentiate from normal parameters.

Spectral Balance 1

Herein, term "spectral balance" refers a balance property of signal energies over the voice frequency band. It may characterize a balance degree of the signal energies over the whole voice frequency band. Since the sibilance has a special spectral distribution feature, i.e., the sibilance voice usually is concentrated on a certain frequency band, the spectral balance feature might be useful for discriminating between non-sibilance voice and sibilance voice.

In an embodiment of the present disclose, the spectral balance feature can be obtained based on the signal energy in the sibilance frequency band and the signal energy in a whole voice frequency band. For example, it can be calculated as the ratio of the signal energy in the sibilance frequency band to the signal energy in a whole voice frequency band. For example, the spectral balance feature can be expressed by $$SB1 = \left(\frac{\sum P2}{\sum P1}\right) \times VAD \qquad \text{(Equation 1)}$$

wherein SB1 represents the calculated spectral balance feature; P1, P2 represent the banded powers representing the voice frequency band and the sibilance frequency band respectively; and "VAD" represents a flag of voice activity detection (VAD) indicator from a VAD module in the pre-processing model (e.g., having value "1" if voice activity is detected and having value "0" otherwise). In other words, SB1 represents the ratio of the sum of the signal energies on all sub-bands in the sibilance frequency band and the sum of the signals on all sub-bands in the whole voice frequency band.

The voice frequency band is for example ranging from 0 Hz to Fs/2 Hz and the sibilance frequency band is ranging for example, from β Hz to Fs/2 Hz, wherein Fs represents the sampling frequency and is usually 32 KHz for super wide-band or 16 KHz for wide-band to restore voice signal; and β represents a start frequency of sibilance voice and one example of β is 4000. In addition, in an audio processing system, there is usually a VAD module which can detect whether there is an active voice in the audio signal. If there is an active voice, it will set the flag VAD as "1" for example; otherwise, it sets the flag "VAD" as "0." Such a flag can be used in embodiments of the present disclosure to facilitate voice signal processing since there is no need to suppress the sibilance if there is no any voice in the voice signal. According to Equation 1, using this flag, the SB1 will be set zero if there is not any voice information in the voice signal, which will ensure that no sibilance is detected in the voice signal that does not contain a voice.

Spectral Balance 2

In another embodiment of the present disclose, the spectral balance feature can be obtained based on the signal energy in a sibilance frequency band and the signal energy in the non-sibilance frequency band. In such a case, the voice frequency band can be divided into two parts, the sibilance frequency band and the non-sibilance frequency band. In other words, the sub-bands divided from the voice frequency band are divided into two groups of sub-bands, one that might contain signal energy of the sibilance, the other that does not or hardly contain signal energy of the sibilance. For example, the spectral balance feature can be calculated as a ratio of the signal energies on the two frequency bands. For example, the spectral balance feature can be expressed by $$SB2 = \left(\frac{\sum P2}{\sum P1}\right) \times VAD \quad \text{(Equation 2)}$$

wherein SB2 represents the calculated spectral balance feature; P1, P2 represent the banded powers representing the non-sibilance frequency band (e.g., from 0 Hz to β Hz) and the sibilance frequency band (e.g. from β Hz to Fs/2 Hz) respectively; and "VAD" represents a flag of voice activity detection (VAD) indicator from the VAD module in the pre-processing module (e.g., having value "1" if voice activity is detected and having value "0" otherwise). In other words, SB2 represents the ratio of the sum of the signal energies on all sub-bands in the sibilance frequency band and the sum of the signal energies on all sub-bands in the non-sibilance frequency band.

Spectral Balance 3

In a further embodiment of the present disclosure, the spectral balance feature can be further determined based on signal-to-noise ratios (SNR) in the sibilance frequency band and the non-sibilance frequency band. For example, the spectral balance feature can be determined as the ratio of the two SNRs.

For example, the spectral balance feature can be expressed by $$SB3 = (10*\log 10(\text{mean}(P2/N2)) - 10*\log 10(\text{mean}(P1/N1)))*VAD \quad \text{(Equation 3)}$$

where SB3 represents the calculated spectral balance feature; P1, P2 represent the banded powers over the non-sibilance frequency band (e.g., from 0 Hz to β Hz) and the sibilance frequency band (e.g. from β Hz to Fs/2 Hz), respectively; N1, N2 represent the banded power of the noise floor over the non-sibilance frequency band and the sibilance frequency band, respectively; and VAD represents the flag of voice activity detection indicator from the VAD module in the pre-processing system and β is the start frequency of sibilance voice and for example is 4000 Hz. In the above, mean(·) indicates a mean value (e.g., geometric mean or arithmetic mean) over a respective one of the sibilance frequency band and the non-sibilance frequency band.

Spectral Centroid (SC)

The term "spectral centroid" or "spectrum centroid" refers to a frequency position at which a center of mass of the spectrum is located. The sibilance has a special spectral distribution feature, i.e., the sibilance voice usually is concentrated on a certain frequency band (e.g., the sibilance frequency band), and the spectral centroids for non-sibilance and sibilance will be quite different. The spectral centroid can characterize a spectrum and indicate where the "center of mass" of the spectrum is, which means this feature can reflect whether the power spectrum of the current frame gathers in the sibilance frequency band or not. Thus, this spectral centroid can be used to discriminate between non-sibilance voice and sibilance voice.

In one example, the spectral centroid feature can be calculated by $$SC = \frac{\sum_{n=1}^{N} f(n)P(n)}{\sum_{n=1}^{N} P(n)} \quad \text{(Equation 4)}$$

where SC represents the value of the calculated SC feature; n represents the index of divided frequency sub-bands; N represents the number of the frequency sub-bands; P(n) represents the banded power of frequency sub-band n; f (n) represents the band central frequency of frequency sub-band n.

Sibilance Spectral Flux (SSF)

The spectral flux or spectrum flux in the sibilance frequency band characterizes the change speed of the power spectrum in the sibilance frequency band. Usually, a change speed of the power spectrum in the sibilance frequency band over time is quite faster than that of non-sibilance voice. Thus, the SSF feature can be used to discriminate between non-sibilance voice and sibilance voice.

In one example, the sibilance spectral flux feature can be calculated by:

$$SSF = \text{abs}(10*\log 10(\text{sum}(P) - 10*\log 10(\text{sum}(Q)) \quad \text{(Equation 5)}$$

where SSF represents a value of the calculated SSF feature; P represents the banded power of the current frame in the sibilance frequency range of [β, Fs/2] and Q represents the banded power of the previous frame in the sibilance frequency range of $[\beta, Fs/2]$. The SSF indicates how quickly the power spectrum of the sibilance voice is changing.

It shall be noticed that one or more of the above features may be used as the predetermined spectrum feature. Based on the one or more predetermined spectrum features, the sibilance identifier 1312 can determine whether the voice signal contains the sibilance or not. For example, the sibilance identifier 1312 may check whether the extracted spectrum feature complies with a property that a spectrum feature for sibilance should have. If the extracted spectrum feature complies with the property, sibilance is detected; otherwise, no sibilance is detected. Checking whether the extracted spectrum feature complies with a property that a spectrum feature for sibilance should have may include comparing the extracted spectrum feature to one or more thresholds (e.g., thresholds that are specific to the given spectrum feature), for example.

In an embodiment of the present disclosure, the sibilance identifier 1312 is configured to classify the voice signal into a sibilance voice, a non-sibilance voice, or a noise or silence based on the predetermined spectrum feature and a voice indicator indicating whether there is an active voice in the voice signal. For illustrative purposes, FIG. 4 illustrates a flow chart of sibilance identification in accordance with an example embodiment of the present disclosure.

Figure 4:
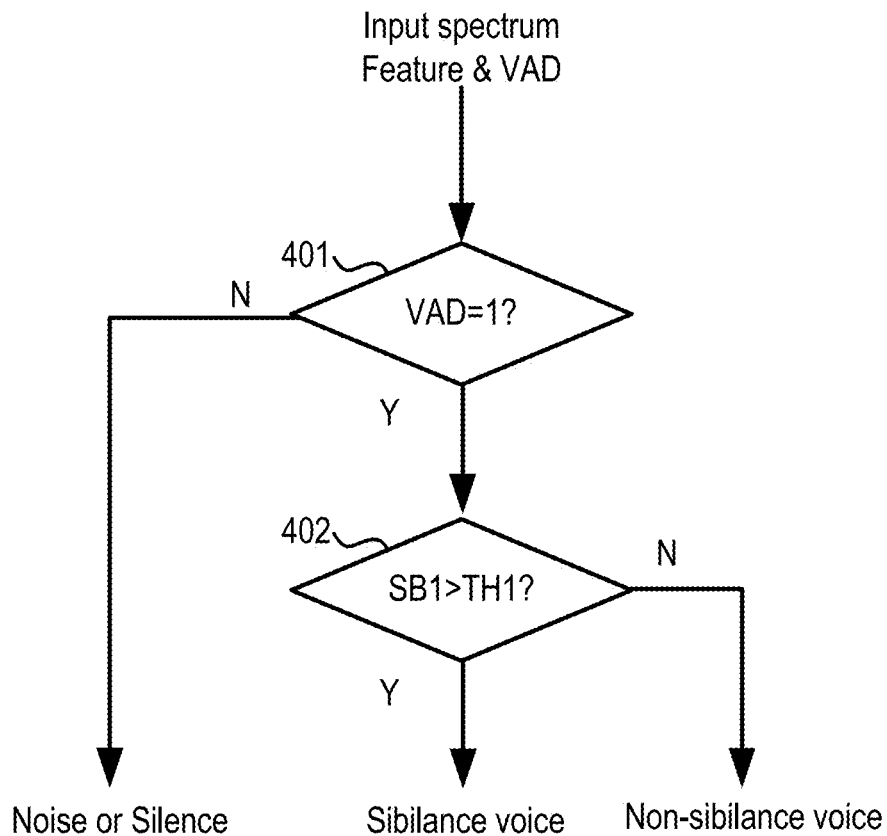
FIG. 4 illustrates a flow chart of sibilance identification in accordance with an example embodiment of the present disclosure.

As illustrated in FIG. 4, first at step 401, it is determined whether the value of the flag VAD is 1 or not. For example, if the VAD is not "1", then the signal is determined as a noise or a silence. If it is determined at step 401 that the value of the flag VAD is 1 (e.g., that the signal comprises a voiced utterance), then at step 402, it is determined whether the value of the spectral balance feature SB1, which is calculated based on Equation 1, is larger than a sibilance spectral balance threshold TH1. If the SB1 is larger than the TH1, the voice signal will be classified as a sibilance voice; otherwise if the SB1 is not larger than the TH1, the voice signal will be classified as non-sibilance voice.

It can be seen that in the classification operation, the sibilance identifier 1312 receives the calculated features and the VAD value and outputs a state indication whether the current frame contains a sibilance voice or not. The classification can be designed and implemented in various ways. Typical designs include heuristic rule based classifiers and those optimized using a machine learning based method. In FIG. 4, the simple implementation of the classifier can be based on heuristically designed rules. However, it should also be noticed that the present disclosure is not limited only to this type of classifiers and any other suitable classifier can also be used. It shall be also noticed that although in FIG. 4, spectral balance feature SB1 is described, the present disclosure is not limited thereto; instead, it is possible to use another feature like SB2, SB3, SC, SSF, or the like as mentioned above, and it is also possible to use more than one of them.

Figure 5:
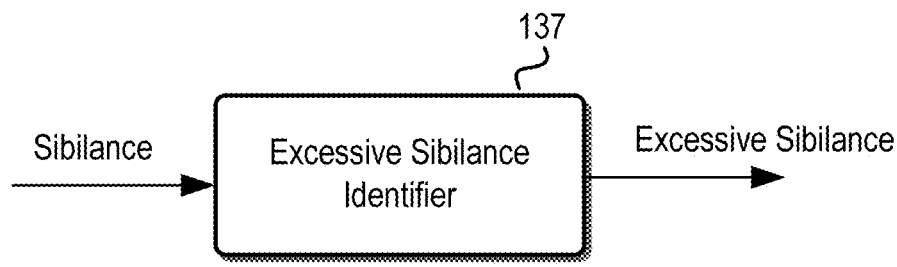
FIG. 5 illustrates a diagram of an excessive sibilance identifier in accordance with another example embodiment of the present disclosure.

After the sibilance is identified, the excessive sibilance may be identified. FIG. 5 illustrates a diagram of excessive sibilance identifier in accordance with another example embodiment of the present disclosure. As illustrated in FIG. 5, the excessive sibilance identifier 137 will receive the identified sibilance and determine whether the sibilance is excessive sibilance or not based on a level of the identified sibilance. It shall be noticed that the excessive sibilance identifier 137 can implemented in many ways. For example, the excessive sibilance identifier 137 may be an inner component in the sibilance detector 131 or an inner component in the sibilance suppressor 132 or a component separated from both the sibilance detector 131 and the sibilance suppressor 132 as long as the excessive sibilance is identified before the suppression can be performed.

Figure 6:
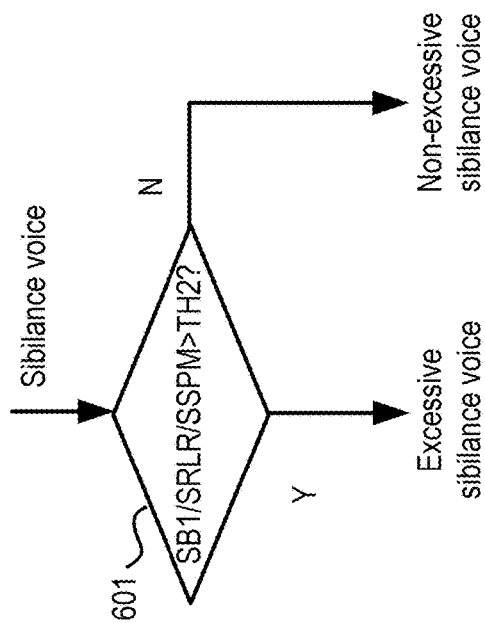
FIG. 6 illustrates a flow chart of excessive sibilance identification in accordance with an example embodiment of the present disclosure.

FIG. 6 illustrates a flow chart of excessive sibilance identification in accordance with an example embodiment of the present disclosure. In the flow chart as illustrated in FIG. 6, at step 601, it will be determined whether the level of the input sibilance voice, an SRLR value, or an SSPM value is higher than a threshold TH2 for excessive sibilance, if yes, then it identifies the sibilance as excessive sibilance voice; if no, it determined that the sibilance is non-excessive sibilance voice which will not cause unpleasant experience to a user.

It shall be understood that although any one of the level of the input sibilance voice, an SRLR value, or an SSPM value can be used as a measure to determine the excessive sibilance, the present disclosure is not limited thereto and it is possible to combine them to identify the excessive sibilance. In addition, for different measures such as the level of the input sibilance voice, the SRLR value, or the SSPM value, the respective threshold TH2 for excessive sibilance is different. The level of the input sibilance voice can be obtained by monitoring the level of the voice signal if sibilance is identified. Hereinafter, The SRLR value, and the SSPM value will be described in details for illustrative purposes.

Figure 7:
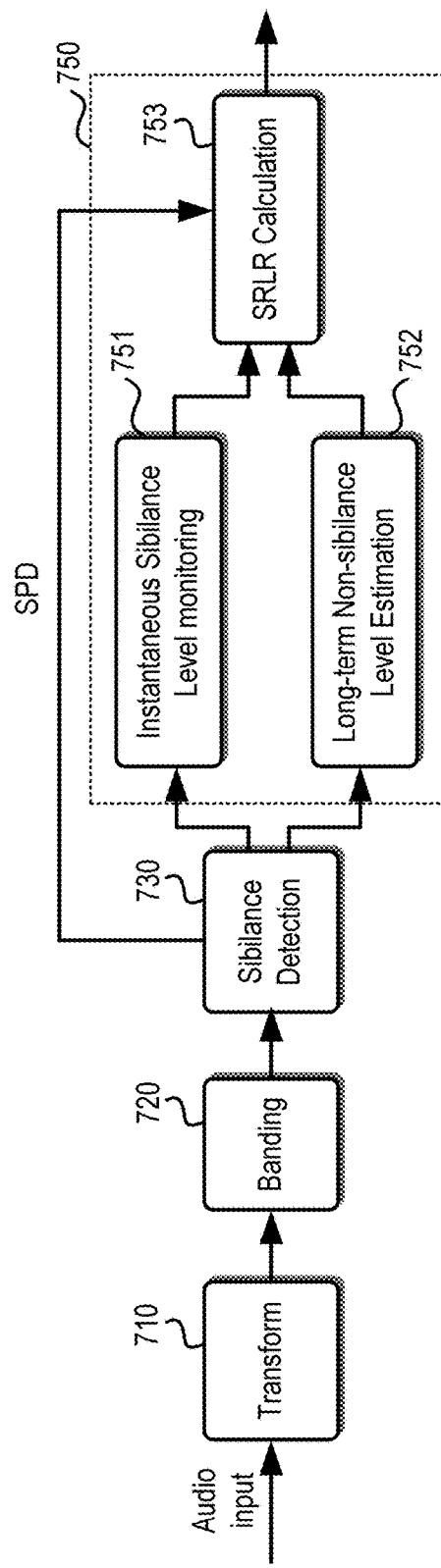
FIG. 7 illustrates a diagram of calculation of Sibilance to long-term non-sibilance Relative Level Ratio (SRLR) in accordance with an example embodiment of the present disclosure.

FIG. 7 illustrates a diagram of SRLR calculation in accordance with an example embodiment of the present disclosure. The term "SRLR" used herein means a ratio of the level of the identified sibilance to a long-term level of non-sibilance voices, which is a relative level of the identified sibilance to a non-sibilance voice. The SRLR can be determined by the ratio between the instantaneous sibilance level (ISL) and the long-term non-sibilance level ($NSL_{LT}$). The term "ISL" means the level of the sibilance in the current frame, the "$NSL_{LT}$" means the level of non-sibilance in a long-term, i.e., in a plurality of frames.

As illustrated in FIG. 7, after the audio signal input is transformed by the transform module 710 and the transformed audio signal is further banded by the banding module 720 and then the sibilance detection is performed on the banded audio signal in the transformed domain by the sibilance detection module 730. It shall be noticed that operations of the transform module 710, the banding module 720 and the sibilance detection module 730 are similar to those as described before with reference to FIG. 1 and thus will not be elaborated herein.

A level ratio determiner or the SRLR determiner 750 is configured to determine a ratio of the level of the identified sibilance to a long-term level of non-sibilance voices. The level ratio determiner 750 may for example include an instantaneous sibilance level monitoring module 751, a long-term non-sibilance level estimation module 752 and a SRLR calculation module 753. The instantaneous sibilance level monitoring module 751 may monitor the level of the voice signal in current frame. If the sibilance detection module indicates that sibilance is detected, it may record the level of the voice signal as the instantaneous sibilance level. The long-term non-sibilance level estimation module 752 is configured to estimate the long-term non-sibilance level, and it can obtain the long-term non-sibilance level based on levels of the non-sibilance voice in a plurality of frames. The SRLR calculation module 753 is configured to calculate the SRLR based on the monitored instantaneous sibilance level and the estimated long-term non-sibilance level. In an example embodiment of the present disclosure, in order to reduce the negative effect of sibilance voice or noisy segments on the performance of $NSL_{LT}$ estimation, a sibilance-presence-detection (SPD) controlled recursive averaging method is proposed, which can be expressed as:

$$NSL_{LT}(n+1)=(1-\alpha(n))\times NSL_{LT}(n)+\alpha(n)\times NSL(n) \quad \text{(Equation 6)}$$

where, $$\alpha(n) = \begin{cases} 0, & (SPD(n) = 1)\|(VAD(n) = 0) \\ \alpha_{LT}, & \text{Otherwise} \end{cases};$$

NSL(n) represents the instantaneous non-sibilance level in frame n;
$NSL_{LT}$ represents the long-term non-sibilance level for fame (n) (e.g., averaged up to frame n);
SPD represents the sibilance presence detection indicator;
VAD represents the voice activity detection indicator;
$\alpha_{LT}$ represents the long-term smoothing parameter.

Thus, it is clear that the $NSL_{LT}$ is given by averaging past non-sibilance level values, using a smoothing parameter $\alpha_{LT}$, which is adjusted by the sibilance presence detection SPD and VAD of each frame, wherein the SPD is the sibilance presence detection indicator, which can be provide by the sibilance detection module 730 and indicate whether there is a sibilance or not; and the VAD, as mentioned before, indicates whether there is a voice signal or not in the current frame. When the sibilance voice or noise is present, the smoothing of the $NSL_{LT}$ will be stopped.

Thus, based on the estimated $NSL_{LT}$ and the monitored ISL, the calculation of SRLR will be regularized by the SRLR calculation module 706 as follows:

$$SRLR(n) = \begin{cases} 0, & SPD(n) = 0 \\ \frac{ISL(n)}{NSL_{LT}(n)}, & \text{otherwise} \end{cases} \quad \text{(Equation 7)}$$

By means of the calculated SRLR, the excessive sibilance can be identified. For example, an SRLR threshold can be set and the excessive sibilance can be identified if the calculated SRLR is higher than the SRLR threshold.

In an example embodiment of the present disclosure, the excessive sibilance can also be identified based on the SSPM. The term "SSPM" used herein means a measure on sibilance spectral peaky degree. It is based on observations that annoying sibilance usually has a relative high spectral peak in (e.g., high) sibilance frequency band. Thus, the spectral peaky degree of sibilance can be used as a factor to identify the excessive sibilance. The SSPM (or peaky degree) may be a measure of a degree of severity (e.g., height, gradient, or the like) of a spectral peak in the sibilance frequency band. For example, the peaky degree of a sibilance spectrum may be based on (e.g., depend on) a calculated geometric mean and a calculated arithmetic mean of banded energies in the voice frequency band (in the presence of the sibilance).

Figure 8:
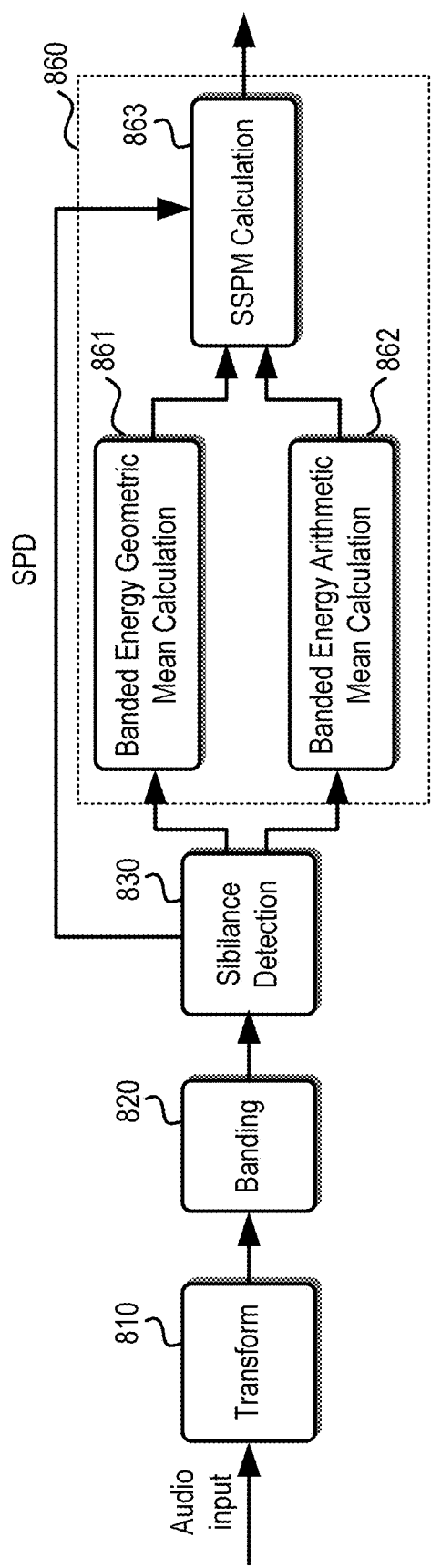
FIG. 8 illustrates a diagram of calculation of Sibilance Spectral Peaky Measure (SSPM) in accordance with an example embodiment of the present disclosure.

There are many potential spectral-related measures that can be used to characterize the peaky condition of voice spectrum. FIG. 8 further illustrates a diagram of SSPM calculation in accordance with an example embodiment of the present disclosure, wherein the SSPM is determined based on geometric mean and arithmetic mean of banded energies in the voice frequency band.

As illustrated in FIG. 8, after the audio signal input transformed by the transform module 810 and the transformed audio signal is further banded by the banding module 820 and then the sibilance detection is performed on the banded audio signal in the transformed domain by the sibilance detection module 830. It shall be noticed that operations of the transform module 810, the banding module 820 and the sibilance detection module 830 are similar to those as described above with reference to FIG. 1 and thus will not be elaborated herein.

The peaky degree determiner 860 is configured to determine a peaky degree of a sibilance spectrum based on banded energies in a sibilance frequency band. The peaky degree determiner 860 may include, for example, a banded energy geometric mean calculation module 861, a banded energy arithmetic mean calculation module 862, an SSPM calculation module 863. The banded energy geometric mean calculation module 861 may be configured to calculate the geometric mean of banded energies in the voice frequency band. The banded energy arithmetic mean calculation module 862 may be configured to calculate the arithmetic mean of banded energies in the voice frequency band. The SSPM calculation module 863 may calculate the peaky degree of a sibilance spectrum based on the calculated geometric mean and the calculated arithmetic mean of banded energies in the voice frequency band. For example, the SSPM is determined by one minus the ratio of the geometric mean of the banded power spectrum to the arithmetic mean of the banded power spectrum, which can be expressed by:

$$SSPM = \begin{cases} 0, & SPD(n) = 0 \\ 1 - \frac{\sqrt[K]{\prod_{1}^{K} X(k)}}{\frac{1}{K}\sum_{k=1}^{K} X(k)}, & \text{otherwise} \end{cases} \quad \text{(Equation 8)}$$

wherein X(k) is the voice band spectrum of sub-band index k and K is the number of the frequency sub-bands. The SPD is the sibilance presence detection indicator. As mentioned hereinabove, the SPD indicates whether there is a sibilance or not in the current frame and can be provide by the sibilance detection module 830.

Besides, other spectral-related measures that can be used to characterize the peaky condition of voice spectrum are listed as follows:
  a variance of adjacent banded energies in the sibilance frequency band;
  a standard deviation of adjacent banded energies in the sibilance frequency band;
  a sum of differences among banded energies (e.g., differences between adjacent banded energies) in the sibilance frequency band;
  a maximum of differences among banded energies (e.g., differences between adjacent banded energies) in the sibilance frequency band;
  a crest factor of banded energies in the sibilance frequency band; and
  spectral entropy in the voice frequency band.

By means of the calculated SSPM, the excessive sibilance can be identified as well.

It shall be understood that the above-mentioned approaches for excessive sibilance identification can be combined in any manner to identify the excessive sibilance. For example, it may be determined that the excessive sibilance is identified if at least one of the level of the sibilance, the SRLR, or the SSPM meets corresponding characteristics of the sibilance, or all of them meet the corresponding characteristics of the sibilance. Moreover, the SRLR and SSPM can also be used to separately or jointly determine the suppression degree in which the excessive sibilance should be suppressed. This means the suppression degree can be different for different SRLR and/or SSPM values.

Thus, the excessive sibilance can be identified. Next reference is made back to FIG. 1, after the excessive sibilance is identified, the suppression gain determiner 1321 and the suppression gain module 1322 may process the voice signal so as to suppress the excessive sibilance.

Figure 9:
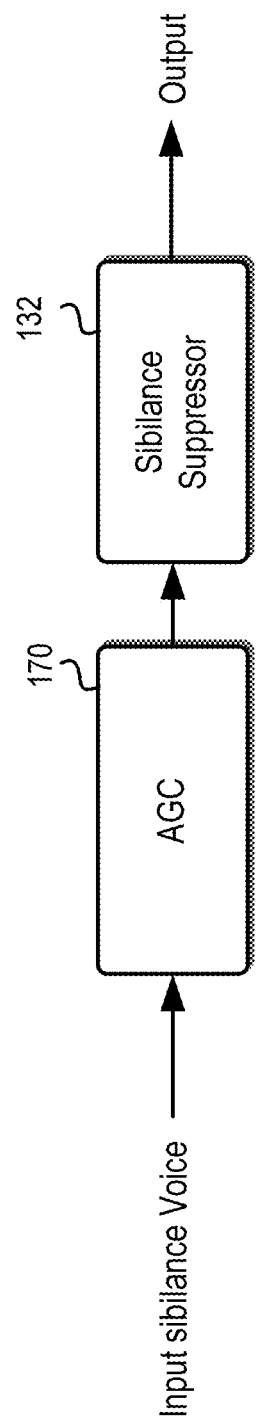
FIG. 9 illustrates an implementation of sibilance management after automatic gain control (AGC) in accordance with an example embodiment of the present disclosure.

It can be understood that the level of sibilance voice shows high correlation with the perception of harshness of sibilance voice. If the input level of the sibilance voice is very high, end-user will have high probability to experience unnatural harshness during the voice call. Another factor that should be considered is the effect of AGC on the perception of sibilance voice in the voice communication system. In a typical voice communication system, automatic gain control (AGC) is often used to perform the level management of the system. The input level of the sibilance voice may be changed due to the automatic gain control module in the system. Thus, as illustrated in FIG. 9, in order to compensate the negative effect of AGC 170 on the input sibilance voice level, the level of sibilance voice after AGC 170 can be used by the sibilance suppressor 132 to perform sibilance management.

The sibilance suppressor 132 may process the voice signal by reducing the level of the excessive sibilance to suppress the excessive sibilance so that it sounds natural. The processing of the voice signal may be performed according to a sibilance suppression curve. Therein, the sibilance may be suppressed only when its level is higher than a predetermined level threshold.

Figure 10:
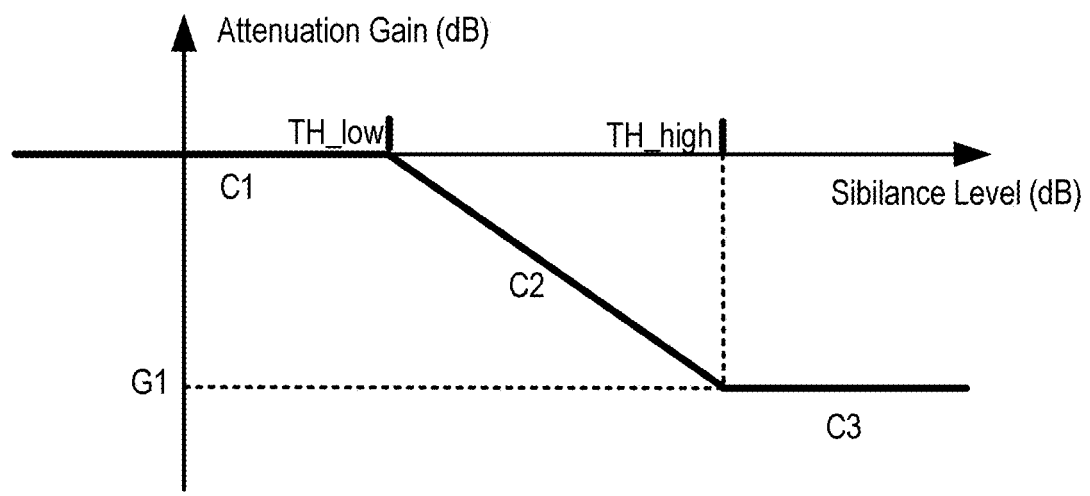
FIG. 10 illustrates a sibilance suppression curve in accordance with an example embodiment of the present disclosure.

The sibilance suppression curve may be an S-shape curve for example as illustrated in FIG. 10. As illustrated in FIG. 10, the sibilance can be suppressed linearly when its level is higher than the predetermined level threshold TH_low but lower than another predetermined level threshold TH_high that is higher than the predetermined level threshold TH_low. The sibilance may be suppressed by a predetermined suppression amount G1 when its level is higher than the other predetermined level threshold TH_high.

In other words, the sibilance suppression curve may include three parts C1, C2 and C3. In the C1 part, the level of sibilance voice after AGC is lower than the low threshold TH_low, and thus the attenuation gain for sibilance suppression will be 0 dB, which means no processing will be done by the sibilance suppressor on the non-sibilance voice and low annoying sibilance voice frames. In the C2 part, the level of sibilance voice after AGC falls within the range between TH_Low and TH_high, and thus a linear suppression model will be triggered. In the C3 part, the level of sibilance voice after AGC is higher than the high threshold TH_high, and the attenuation gain for sibilance suppression will be set as G1, which is the maximum sibilance suppression depth of the system.

If the level of sibilance voice after AGC is defined as SL and the attenuation gain for sibilance suppression as G, the proposed sibilance suppression model can be derived as follows:

$$G(n) = \begin{cases} 0, & SL(n) \leq TH_{Low} \\ G, & SL(n) \geq TH_{High} \\ \frac{SL(n) - TH_{Low}}{SL(n) - TH_{High}}, & TH_{Low} < SL(n) < TH_{High} \end{cases}$$

wherein G (n) represents the suppression gain G in the n-th frame index, SL(n) represents the level of sibilance voice after AGC in the n-th frame index, $TH_{Low}$ represents the lower threshold TH_low, and $TH_{high}$ represents the higher threshold TH_high.

In a further embodiment of the present disclosure, an operating mode in which the sibilance is suppressed can be further controlled adaptively based on one or more high level perceptual-related sibilance measures such as SRLR, SSPM, etc. The SRLR and SSPM are those described hereinbefore with reference to FIGS. 7 and 8 and thus will not be elaborated herein.

Figure 11:
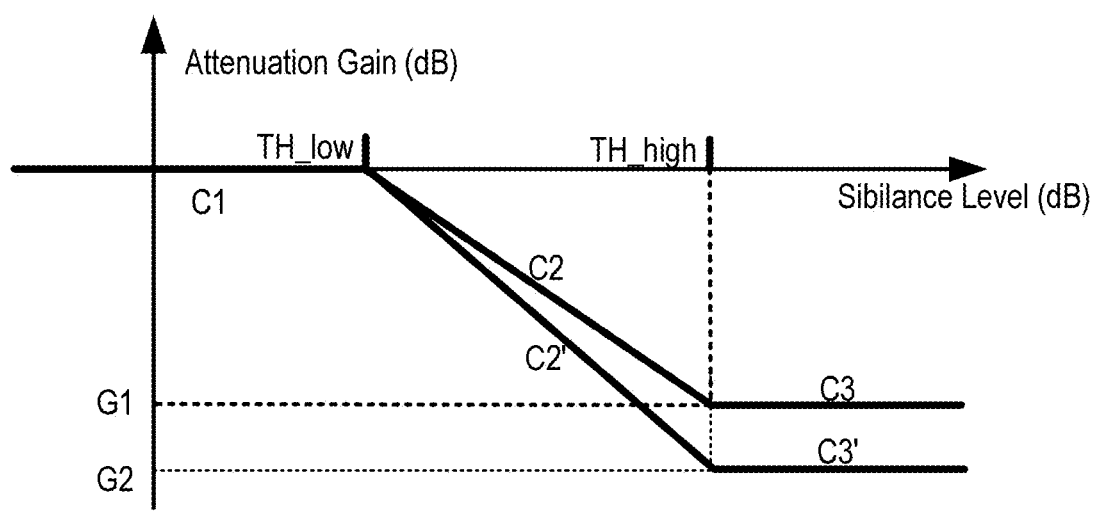
FIG. 11 illustrates a sibilance suppression curve in accordance with another example embodiment of the present disclosure.

FIG. 11 illustrates a sibilance suppression curve in accordance with another example embodiment of the present disclosure. As illustrated in FIG. 11, the sibilance suppression has two operation modes, a normal mode and an aggressive mode. The normal mode has a sibilance suppression curve including parts C1, C2 and C3 while the aggressive mode has a sibilance suppression curve including parts C1, C2' and C3'. In the aggressive mode, the maximum suppression depth is increased, in other words, the Gain G2 for the aggressive mode is lower (e.g., more negative) than the gain G1 for the normal mode, and the C2' part has a steeper slope than the C2 part and thus is more aggressive.

Figure 12:
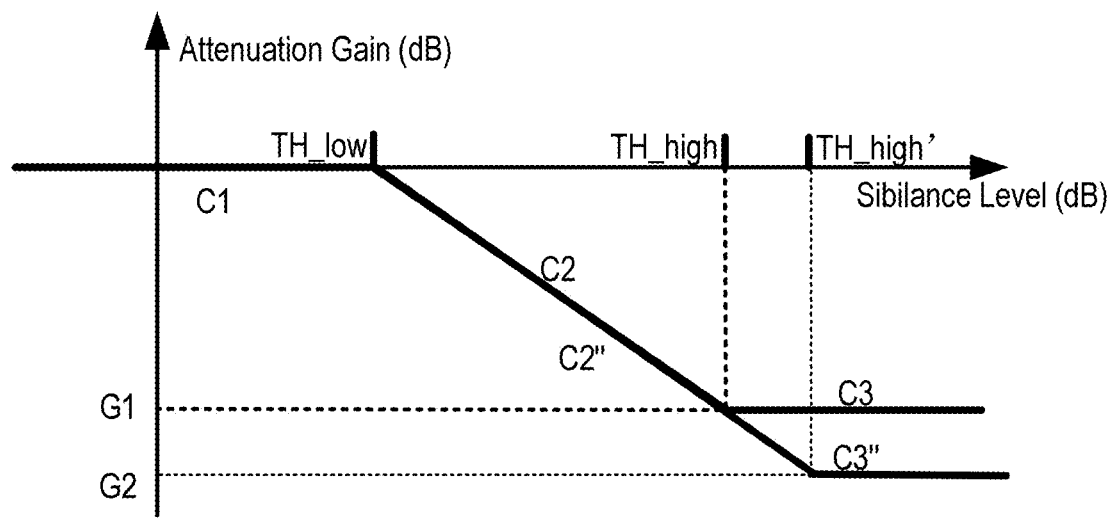
FIG. 12 illustrates a sibilance suppression curve in accordance with a further example embodiment of the present disclosure.

FIG. 12 illustrates a sibilance suppression curve in accordance with a further example embodiment of the present disclosure. As illustrated in FIG. 12, the sibilance suppression also has two operation modes, a normal mode and an aggressive mode. The normal mode has a sibilance suppression curve including parts C1, C2 and C3 while the aggressive mode has a sibilance suppression curve including parts C1, C2" and C3". In the aggressive mode, the maximum suppression depth is increased and the new threshold TH_high' which is larger than TH_high in the normal mode used, which makes this mode more aggressive in sibilance suppression.

Figure 13:
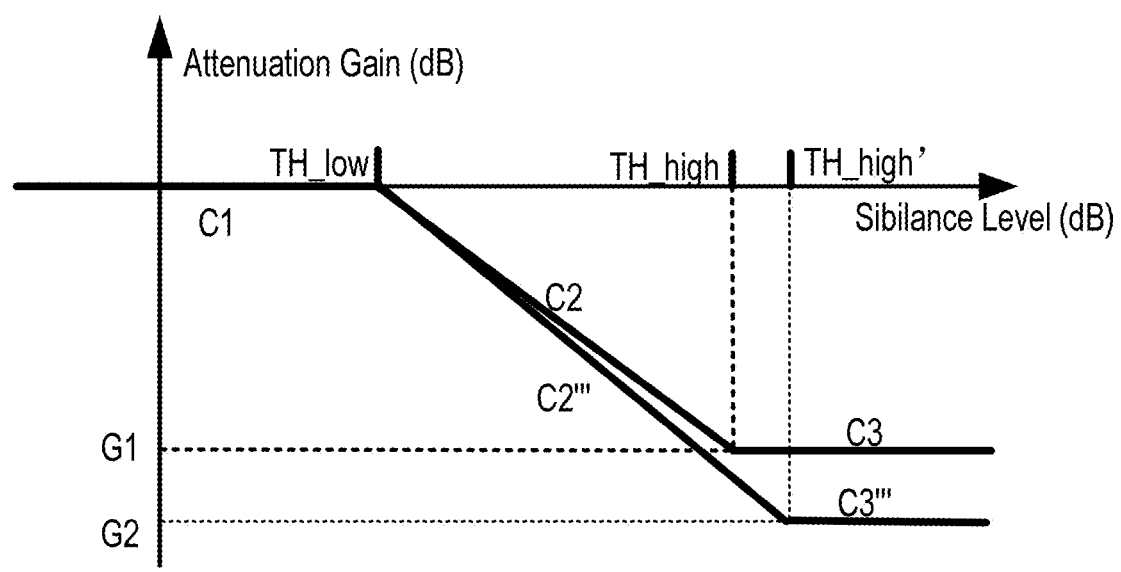
FIG. 13 illustrates a sibilance suppression curve in accordance with a still further example embodiment of the present disclosure.

FIG. 13 illustrates a sibilance suppression curve in accordance with a still further example embodiment of the present disclosure. As illustrated in FIG. 13, the sibilance suppression also has two operation modes, a normal mode and an aggressive mode. The normal mode has a sibilance suppression curve including parts C1, C2 and C3 while the aggressive mode has a sibilance suppression curve including parts C1, C2''' and C3'''. In the aggressive mode, the maximum suppression depth is increased and the new threshold TH_high' which is larger than TH_high used in the normal mode and different from the curve in FIG. 12, the C2''' part has a steeper slope than the C2 part, which makes this mode more aggressive in sibilance suppression.

It shall be noticed that although in the C2, C2', C2" and C2''' parts, the sibilance suppression is performed linearly, the present disclosure is not limited thereto. Instead, it is also possible to perform the sibilance suppression non-linearly (e.g., any monotonous function with a given first gain value at TH_low and a given second gain value at TH_high (or TH_high') can be used). In addition, it is possible to use any one of SRLR and SSPM as a measure to determine whether to adjust the operation mode of the sibilance suppression or use both of them. In addition, although the operation mode is described as two modes, it is also possible includes more than two modes and it is also possible to have operation modes which changes gradually based on the measure SRLR and/or SSPM.

Thus, based on any sibilance suppression curve as mentioned above, it is possible to suppress the excessive sibilance without harming the non-sibilance voice or the low annoying sibilance voice. After that, the processed voice signal can be transformed back to the original domain, for example the time domain for other processing in the audio processing system.

Based on the above-described description, it is clear that in embodiments of the present disclosure, a predetermined spectrum feature representing a distribution of signal energy over a voice frequency band is extracted from the voice signal; based on the predetermined spectrum feature, it is determined whether there is sibilance in the voice signal or not; then it may identify excessive sibilance from the identified sibilance based on a level of the identified sibilance; once the excessive sibilance is identified, it may decrease a level of the excessive sibilance so as to suppress the excessive sibilance so that it sounds natural. In addition, a sibilance suppression mode in which the sibilance suppression is performed can also be adaptively controlled by one or more high level perceptual-related sibilance measures such as SRLR, SSPM, etc., to achieve a better sibilance suppression effect.

Figure 14:
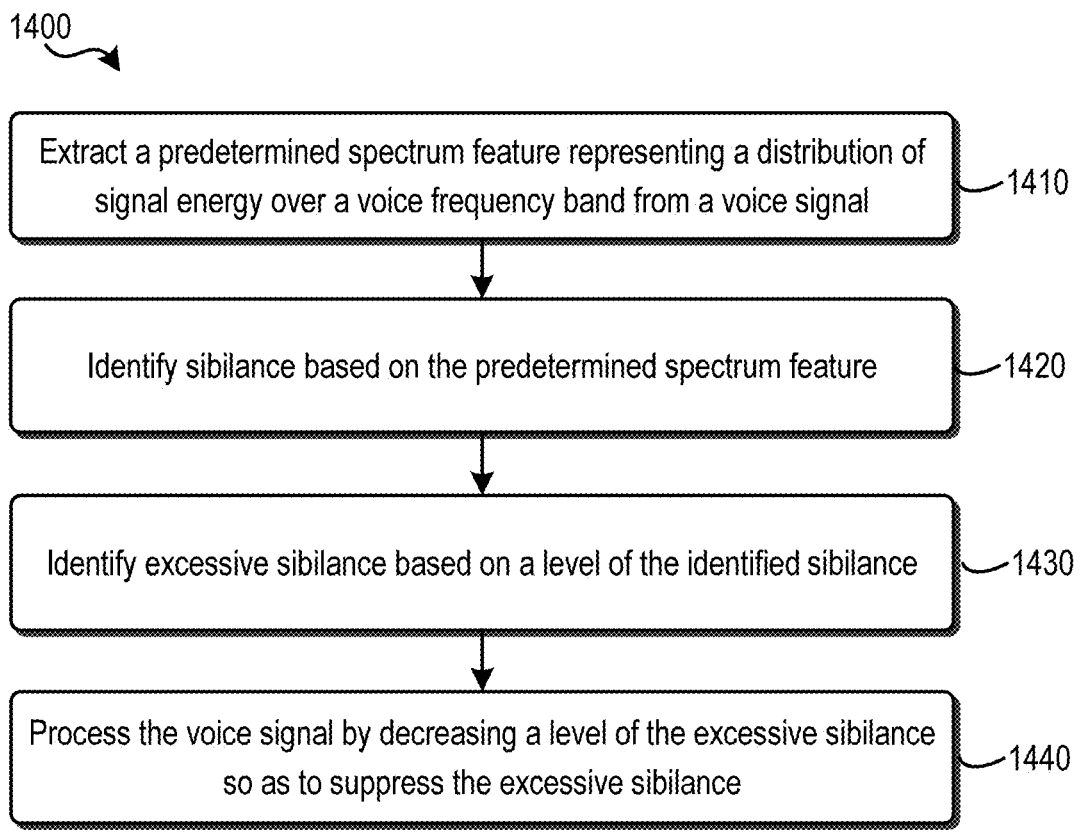
FIG. 14 illustrates a flowchart of a method of sibilance detection and mitigation in accordance with an example embodiment of the present disclosure.

FIG. 14 illustrates a flowchart of a method 1400 of sibilance detection and mitigation in accordance with an example embodiment of the present disclosure.

As illustrated in FIG. 14, the method 1400 begins from step 1410, where a predetermined spectrum feature is extracted from a voice signal. The predetermined spectrum feature can be a feature representing a distribution of signal energy over a voice frequency band. In embodiments of the present disclosure, the predetermined spectrum feature may include any of a ratio of signal energy in the sibilance frequency band to signal energy in the voice frequency band; a ratio of signal energy in a sibilance frequency band to signal energy in a non-sibilance frequency band; a ratio of signal-to-noise ratio (SNR) in the sibilance frequency band and SNR in the non-sibilance frequency band; a spectrum centroid indicating a frequency position at which a center of mass of the spectrum is located; and a spectrum flux in the sibilance frequency band.

Then at step 1420, sibilance can be identified based on the predetermined spectrum feature. In embodiments of the present disclosure, the sibilance can be identified by classifying the voice signal into a sibilance voice, a non-sibilance voice and a noise or silence, based on the predetermined spectrum feature and a voice indicator indicating whether there is an active voice in the voice signal.

In step 1430, excessive sibilance is further identified from the identified sibilance based on its level. In an embodiment of the present disclosure, a ratio of the level of the identified sibilance to a long-term level of non-sibilance voices is determined; and whether the identified sibilance is excessive sibilance is determined based on the ratio. In another embodiment of the present disclosure, a peaky degree of a sibilance spectrum may be determined based on banded energies in a sibilance frequency band and the peaky degree may be used to determine whether the identified sibilance is excessive sibilance. In embodiments of the present disclosure, the peaky degree of a sibilance spectrum can be determined based on any of: geometric mean and arithmetic mean of banded energies in the voice frequency band; a variance of adjacent banded energies in the sibilance frequency band; a standard deviation of adjacent banded energies in the sibilance frequency band; a sum of differences among banded energies in the sibilance frequency band; a maximum of differences among banded energies in the sibilance frequency band; a crest factor of banded energies in the sibilance frequency band; and spectral entropy in the voice frequency band.

Next, in step 1440, the voice signal is processed by decreasing a level of the excessive sibilance so as to suppress the excessive sibilance. In an embodiment of the present disclosure, the voice signal may be processed after an automatic gain control is performed on the voice signal so as to avoid the effect of AGC on the perception of sibilance voice in the voice communication system.

In another embodiment of the present disclosure, the voice signal may be processed according to a sibilance suppression curve, wherein the sibilance is suppressed only when its level is higher than a predetermined level threshold. The sibilance suppression curve may be for example an S-shape curve. In accordance with the S-shape curve, the sibilance is suppressed linearly or non-linearly when its level is higher than the predetermined level threshold but lower than another predetermined level threshold that is higher than the predetermined level threshold, and wherein the sibilance is suppressed by a predetermined suppression amount when its level is higher than the other predetermined level threshold.

In a further embodiment of the present disclosure, it may determine a ratio of the level of the identified sibilance to a long-term level of non-sibilance voices. Alternatively or additionally, it may determine a peaky degree of a sibilance spectrum based on banded energies in a sibilance frequency band. Based on any of the ratio and the peaky degree, an operating mode, in which the sibilance is suppressed, can be controlled or adjusted. The controlling an operating mode may be implemented by any of: adjusting the predetermined suppression amount; and adjusting the predetermined suppression amount and the other predetermined level threshold.

It can be understood that for a purpose of simplification, the method as illustrated in FIG. 14 is described in brief; for detailed description of respective operations, one can find in the corresponding description with reference FIGS. 1 to 13.

It can be appreciated that although specific embodiments of the present disclosure are described herein, those embodiments are only given for an illustration purpose and the present disclosure is not limited thereto. For example, although it uses the audio communication system as an example of audio processing system, the present disclosure is not limited thereto; instead embodiments of the present disclosure can be used in any scenarios requiring voice quality improvement, for example, in voice call, voice playing, pre-processing or post-processing on music production and so on.

In addition, it is also to be understood that the components of as illustrated in FIGS. 1, 2, 5, and 7 to 9 may be hardware modules or software modules. For example, in some example embodiments, the system may be implemented partially or completely as software and/or firmware, for example, implemented as a computer program product embodied in a computer readable medium. Alternatively or additionally, the system may be implemented partially or completely based on hardware, for example, as an integrated circuit (IC), an application-specific integrated circuit (ASIC), a system on chip (SOC), a field programmable gate array (FPGA), and the like.

Figure 15:
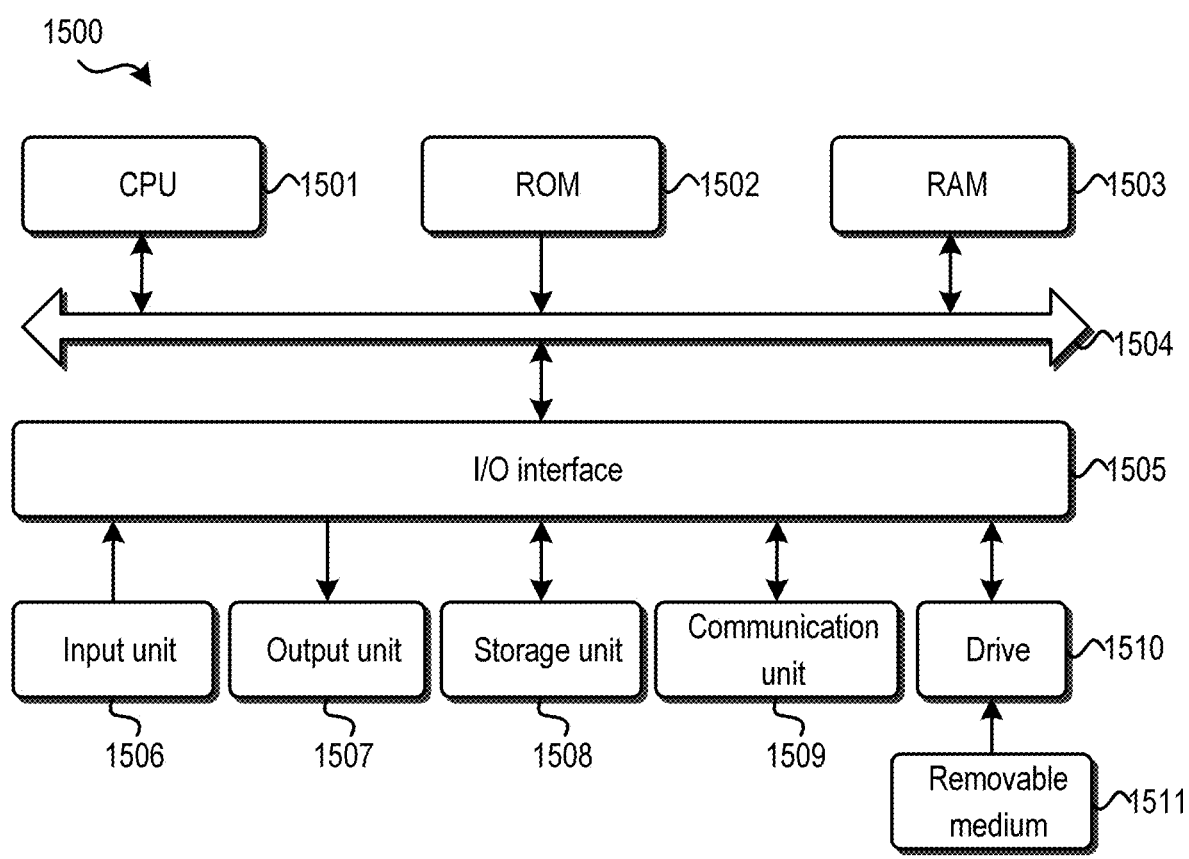
FIG. 15 illustrates a block diagram of an example system suitable for implementing example embodiments of the present disclosure.

FIG. 15 shows a block diagram of an example system 1500 suitable for implementing example embodiments of the present disclosure. As shown, the system 1500 includes a central processing unit (CPU) 1501 which is capable of performing various processes in accordance with a program stored in a read only memory (ROM) 1502 or a program loaded from a storage unit 1508 to a stochastic access memory (RAM) 1503. In the RAM 1503, data required when the CPU 1501 performs the various processes or the like is also stored as required. The CPU 1501, the ROM 1502 and the RAM 1503 are connected to one another via a bus 1504. An input/output (I/O) interface 1505 is also connected to the bus 1504.

The following components are connected to the I/O interface 1505: an input unit 1506 including a keyboard, a mouse, or the like; an output unit 1507 including a display such as a cathode ray tube (CRT), a liquid crystal display (LCD), or the like, and a loudspeaker or the like; the storage unit 1508 including a hard disk or the like; and a communication unit 1509 including a network interface card such as a LAN card, a modem, or the like. The communication unit 1509 performs a communication process via the network such as the internet. A drive 1510 is also connected to the I/O interface 1505 as required. A removable medium 1511, such as a magnetic disk, an optical disk, a magneto-optical disk, a semiconductor memory, or the like, is mounted on the drive 1510 as required, so that a computer program read therefrom is installed into the storage unit 1508 as required. It shall be noticed although the system 1500 is described as including the above-described components, in real applications, it is possible to add, remove, and/or replace some of these components and all these modifications or alteration all fall within the scope of the present disclosure.

Specifically, in accordance with example embodiments of the present disclosure, the processes described above may be implemented as computer software programs. For example, embodiments of the present disclosure include a computer program product including a computer program tangibly embodied on a machine readable medium, the computer program including program code for performing methods. In such embodiments, the computer program may be downloaded and mounted from the network via the communication unit 1509, and/or installed from the removable medium 1511.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other embodiments of the inventions set forth herein will come to mind to one skilled in the art to which these embodiments of the invention pertain having the benefit of the teachings presented in the foregoing descriptions and the drawings.

The present disclosure may be embodied in any of the forms described herein. For example, the following enumerated example embodiments (EEEs) describe some structures, features, and functionalities of some aspects of the present disclosure.

EEE 1. A method of sibilance detection and mitigation, comprising: extracting a predetermined spectrum feature representing a distribution of signal energy over a voice frequency band from a voice signal; identifying sibilance based on the predetermined spectrum feature; identifying excessive sibilance based on a level of the identified sibilance; and processing the voice signal by decreasing a level of the excessive sibilance so as to suppress the excessive sibilance.

EEE 2. The method of EEE 1, wherein the identifying sibilance based on the predetermined spectrum feature comprises: classifying the voice signal into a sibilance voice, a non-sibilance voice, or a noise or silence based on the predetermined spectrum feature and a voice indicator indicating whether there is an active voice in the voice signal.

EEE 3. The method of EEE 1, further comprising: determining a ratio of the level of the identified sibilance to a long-term level of non-sibilance voices; wherein the identifying excessive sibilance based on a level of the identified sibilance comprises: determining whether the identified sibilance is excessive sibilance based on the ratio.

EEE 4. The method of EEE 1, further comprising: determining a peaky degree of a sibilance spectrum based on banded energies in a sibilance frequency band, wherein the identifying excessive sibilance based on a level of the identified sibilance comprises: determining whether the identified sibilance is excessive sibilance based on the peaky degree.

EEE 5. The method of EEE 1, wherein the processing the voice signal comprises: processing the voice signal after an automatic gain control is performed on the voice signal.

EEE 6. The method of EEE 1, wherein the processing the voice signal comprises: processing the voice signal according to a sibilance suppression curve, wherein the sibilance is suppressed only when its level is higher than a predetermined level threshold.

EEE 7. The method of EEE 6, wherein the sibilance suppression curve is an S-shape curve and wherein the sibilance is suppressed linearly or non-linearly when its level is higher than the predetermined level threshold but lower than another predetermined level threshold that is higher than the predetermined level threshold, and wherein the sibilance is suppressed by a predetermined suppression amount when its level is higher than the other predetermined level threshold.

EEE 8. The method of EEE 7, further comprising any of determining a ratio of the level of the identified sibilance to a long-term level of non-sibilance voices; and determining a peaky degree of a sibilance spectrum based on banded energies in a sibilance frequency band, wherein the method further comprises: controlling an operating mode in which the sibilance is suppressed, based on any of the ratio and the peaky degree.

EEE 9. The method of EEE 8, wherein the controlling an operating mode in which the sibilance is suppressed comprising any of: adjusting the predetermined suppression amount; and adjusting the predetermined suppression amount and the other predetermined level threshold.

EEE 10. The method of EEE 1, wherein the predetermined spectrum feature comprises any of: a ratio of signal energy in a sibilance frequency band to signal energy in the voice frequency band; a ratio of signal energy in the sibilance frequency band to signal energy in a non-sibilance frequency band; a ratio of signal-to-noise ratio (SNR) in the sibilance frequency band and SNR in the non-sibilance frequency band; a spectrum centroid indicating a frequency position at which a center of mass of the spectrum is located; and a spectrum flux in the sibilance frequency band.

EEE 11. The method of EEE 4, wherein the peaky degree of the sibilance spectrum can be determined based on any of: geometric mean and arithmetic mean of banded energies in the voice frequency band; a variance of adjacent banded energies in the sibilance frequency band; a standard deviation of adjacent banded energies in the sibilance frequency band; a sum of differences among banded energies in the sibilance frequency band; a maximum of differences among banded energies in the sibilance frequency band; a crest factor of banded energies in the sibilance frequency band; and spectral entropy in the voice frequency band.

EEE 12. A system of sibilance detection and mitigation, comprising: a feature extractor, configured to extract a predetermined spectrum feature representing a distribution of signal energy over a voice frequency band from a voice signal; a sibilance identifier configured to identify sibilance based on the predetermined spectrum feature; an excessive sibilance identifier configured to identify excessive sibilance based on a level of the identified sibilance; and a sibilance suppressor configured to process the voice signal by decreasing a level of the excessive sibilance so as to suppress the excessive sibilance.

EEE 13. The system of EEE 12, wherein the sibilance identifier is configured to: classify the voice signal into a sibilance voice, a non-sibilance voice, or a noise or silence based on the predetermined spectrum feature and a voice indicator indicating whether there is an active voice in the voice signal.

EEE 14. The system of EEE 12, further comprising: a level ratio determiner configured to determine a ratio of the level of the identified sibilance to a long-term level of non-sibilance voices; wherein the excessive sibilance identifier is configured to determine whether the identified sibilance is excessive sibilance based on the ratio.

EEE 15. The system of EEE 12, further comprising: a peaky degree determiner configured to determine a peaky degree of a sibilance spectrum based on banded energies in a sibilance frequency band, wherein the excessive sibilance identifier is configured to determine whether the identified sibilance is excessive sibilance based on the peaky degree.

EEE 16. The system of EEE 12, wherein the sibilance suppressor is configured to process the voice signal after an automatic gain control is performed on the voice signal.

EEE 17. The system of EEE 12, wherein the sibilance suppressor is further configured to process the voice signal according to a sibilance suppression curve, wherein the sibilance suppressor suppresses the sibilance only when its level is higher than a predetermined level threshold.

EEE 18. The system of EEE 17, wherein the sibilance suppression curve is an S-shape curve and wherein the sibilance suppressor is configured to suppress the sibilance linearly or non-linearly when its level is higher than the predetermined level threshold but lower than another predetermined level threshold that is higher than the predetermined level threshold, and to suppress the sibilance by a predetermined suppression amount when its level is higher than the other predetermined level threshold.

EEE 19. The system of EEE 18, further comprising any of a level ratio determiner configured to determine a ratio of the level of the identified sibilance to a long-term level of non-sibilance voices; and a peaky degree determiner configured to determine a peaky degree of a sibilance spectrum based on banded energies in a sibilance frequency band, wherein the system further comprises: an adaptive mode controller, configured to control an operating mode in which the sibilance is suppressed, based on any of the ratio and the peaky degree.

EEE 20. The system of EEE 19, wherein the adaptive mode controller is further configured to control the operating mode by any of: adjusting the predetermined suppression amount; and adjusting the predetermined suppression amount and the other predetermined level threshold.

EEE 21. The system of EEE 12, wherein the predetermined spectrum feature comprises any of: a ratio of signal energy in a sibilance frequency band to signal energy in the voice frequency band; a ratio of signal energy in the sibilance frequency band to signal energy in a non-sibilance frequency band; a ratio of signal-to-noise ratio (SNR) in the sibilance frequency band and SNR in the non-sibilance frequency band; a spectrum centroid indicating a frequency position at which a center of mass of the spectrum is located; and a spectrum flux in the sibilance frequency band.

EEE 22. The system of EEE 15, wherein the peaky degree of the sibilance spectrum can be determined based on any of: geometric mean and arithmetic mean of banded energies in the voice frequency band; a variance of adjacent banded energies in the sibilance frequency band; a standard deviation of adjacent banded energies in the sibilance frequency band; a sum of differences among banded energies in the sibilance frequency band; a maximum of differences among banded energies in the sibilance frequency band; a crest factor of banded energies in the sibilance frequency band; and spectral entropy in the voice frequency band.

EEE 23. A computer program product of sibilance detection and mitigation, the computer program product being tangibly stored on a non-transient computer-readable medium and comprising machine executable instructions which, when executed, cause the machine to perform steps of the method according to any one of EEE 1 to EEE 11.

The invention claimed is:

1. A method of sibilance detection and mitigation, comprising:
   extracting a predetermined spectrum feature representing a distribution of signal energy over a voice frequency band from a voice signal;
   determining a binary voice indicator from the voice signal, the binary voice indicator indicating whether active voice is present in the voice signal;
   in response to determining the binary voice indicator indicating that the active voice is present in the voice signal, performing:
      identifying sibilance based on the predetermined spectrum feature;
      determining whether the identified sibilance is an excessive sibilance based on comparing a level of the identified sibilance in a current frame with a long-term non-sibilance level estimated based on levels of non-sibilance voice in a plurality of frames; and
      in response to determining that the identified sibilance is an excessive sibilance based on comparing the level of the identified sibilance in the current frame with the long-term non-sibilance level estimated based on the levels of the non-sibilance voice in the plurality of frames, processing the voice signal by decreasing a level of the excessive sibilance so as to suppress the excessive sibilance.

2. The method of claim 1, wherein the identifying sibilance based on the predetermined spectrum feature comprises:
   classifying the voice signal into a sibilance voice, a non-sibilance voice, or a noise or silence based on the predetermined spectrum feature and the binary voice indicator; and/or
   wherein the processing the voice signal comprises: processing the voice signal after an automatic gain control is performed on the voice signal.

3. The method of claim 1, further comprising any of:
   determining a ratio of the level of the identified sibilance to a long-term level of non-sibilance voices; and
   determining a peaky degree of a sibilance spectrum based on banded energies in a sibilance frequency band,
   wherein the identifying excessive sibilance based on a level of the identified sibilance comprises: determining whether the identified sibilance is excessive sibilance based on any of the ratio and the peaky degree.

4. The method of claim 1, wherein the processing the voice signal comprises: processing the voice signal according to a sibilance suppression curve, wherein the sibilance is suppressed only when its level is higher than a predetermined level threshold.

5. The method of claim 4, wherein the sibilance suppression curve is an S-shape curve and wherein the sibilance is suppressed linearly or non-linearly when its level is higher than the predetermined level threshold but lower than another predetermined level threshold that is higher than the predetermined level threshold, and wherein the sibilance is suppressed by a predetermined suppression amount when its level is higher than the other predetermined level threshold.

6. The method of claim 5, further comprising any of:
   determining a ratio of the level of the identified sibilance to a long-term level of non-sibilance voices; and
   determining a peaky degree of a sibilance spectrum based on banded energies in a sibilance frequency band,
   wherein the method further comprises:
   controlling an operating mode in which the sibilance is suppressed, based on any of the ratio and the peaky degree, and
   wherein the controlling an operating mode in which the sibilance is suppressed comprises any of:
      adjusting the predetermined suppression amount; and
      adjusting the predetermined suppression amount and the other predetermined level threshold.

7. The method of claim 1, wherein the processing the voice signal comprises:
   processing the voice signal according to a sibilance suppression curve,
   wherein the sibilance is suppressed by a predetermined suppression amount when its level is higher than a predetermined level threshold;
   wherein the method further comprises any of:
   determining a ratio of the level of the identified sibilance to a long-term level of non-sibilance voices; and
   determining a peaky degree of a sibilance spectrum based on banded energies in a sibilance frequency band;
   wherein the method further comprises: controlling an operating mode in which the sibilance is suppressed, based on any of the ratio and the peaky degree, and
   wherein the controlling an operating mode in which the sibilance is suppressed comprises any of:
      adjusting the predetermined suppression amount; and
      adjusting the predetermined suppression amount and the other predetermined level threshold.

8. The method of claim 1, wherein the predetermined spectrum feature comprises any of:
   a ratio of signal energy in a sibilance frequency band to signal energy in the voice frequency band;
   a ratio of signal energy in the sibilance frequency band to signal energy in a non-sibilance frequency band; a ratio of signal-to-noise ratio (SNR) in the sibilance frequency band and SNR in the non-sibilance frequency band;
   a spectrum centroid indicating a frequency position at which a center of mass of the spectrum is located; and
   a spectrum flux in the sibilance frequency band.

9. The method of claim 3, wherein the peaky degree of the sibilance spectrum is determined based on any of:

geometric mean and arithmetic mean of banded energies in the voice frequency band;
a variance of adjacent banded energies in the sibilance frequency band;
a standard deviation of adjacent banded energies in the sibilance frequency band;
a sum of differences among banded energies in the sibilance frequency band;
a maximum of differences among banded energies in the sibilance frequency band;
a crest factor of banded energies in the sibilance frequency band; and
spectral entropy in the voice frequency band.

10. A system of sibilance detection and mitigation, comprising:
one or more processors;
a non-transitory computer-readable medium storing a sequence of computing instructions, which when executed by the one or more processors, causes the one or more processors to perform:
extracting a predetermined spectrum feature representing a distribution of signal energy over a voice frequency band from a voice signal;
determining a binary voice indicator from the voice signal, the binary voice indicator indicating whether active voice is present in the voice signal;
in response to determining the binary voice indicator indicating that the active voice is present in the voice signal, performing:
identifying sibilance based on the predetermined spectrum feature;
determining whether the identified sibilance is an excessive sibilance based on comparing a level of the identified sibilance in a current frame with a long-term non-sibilance level estimated based on levels of non-sibilance voice in a plurality of frames; and
in response to determining that the identified sibilance is an excessive sibilance based on comparing the level of the identified sibilance in the current frame with the long-term non-sibilance level estimated based on the levels of the non-sibilance voice in the plurality of frames, processing the voice signal by decreasing a level of the excessive sibilance so as to suppress the excessive sibilance.

11. The system of claim 10, wherein the sequence of computing instructions, which when executed by the one or more processors, causes the one or more processors to further perform classifying the voice signal into a sibilance voice, a non-sibilance voice, or a noise or silence based on the predetermined spectrum feature and binary voice indicator; and/or
processing the voice signal after an automatic gain control is performed on the voice signal.

12. The system of claim 10, wherein the sequence of computing instructions, which when executed by the one or more processors, causes the one or more processors to further perform any of:
determining a ratio of the level of the identified sibilance to a long-term level of non-sibilance voices; and
determining a peaky degree of a sibilance spectrum based on banded energies in a sibilance frequency band,
determining whether the identified sibilance is excessive sibilance based on any of the ratio or the peaky degree.

13. The system of claim 10, wherein the sequence of computing instructions, which when executed by the one or more processors, causes the one or more processors to further perform processing the voice signal according to a sibilance suppression curve, and suppressing the sibilance only when its level is higher than a predetermined level threshold.

14. The system of claim 13, wherein the sibilance suppression curve is an S-shape curve and wherein the sequence of computing instructions, which when executed by the one or more processors, causes the one or more processors to further perform suppressing the sibilance linearly or non-linearly when its level is higher than the predetermined level threshold but lower than another predetermined level threshold that is higher than the predetermined level threshold, and suppressing the sibilance by a predetermined suppression amount when its level is higher than the other predetermined level threshold.

15. The system of claim 14, wherein the sequence of computing instructions, which when executed by the one or more processors, causes the one or more processors to further perform any of:
determining a ratio of the level of the identified sibilance to a long-term level of non-sibilance voices; and
determining a peaky degree of a sibilance spectrum based on banded energies in a sibilance frequency band,
wherein the sequence of computing instructions, which when executed by the one or more processors, causes the one or more processors to further perform:
controlling an operating mode in which the sibilance is suppressed, based on any of the ratio and the peaky degree, and controlling the operating mode by any of:
adjusting the predetermined suppression amount; and
adjusting the predetermined suppression amount and the other predetermined level threshold.

16. The system of claim 10, wherein the sequence of computing instructions, which when executed by the one or more processors, causes the one or more processors to further perform:
processing the voice signal according to a sibilance suppression curve;
suppressing the sibilance by a predetermined suppression amount when its level is higher than a predetermined level threshold;
wherein the system further comprises any of:
a level ratio determiner that determines a ratio of the level of the identified sibilance to a long-term level of non-sibilance voices; and
a peaky degree determiner that determines a peaky degree of a sibilance spectrum based on banded energies in a sibilance frequency band;
wherein the sequence of computing instructions, which when executed by the one or more processors, causes the one or more processors to further perform any of:
controlling an operating mode in which the sibilance is suppressed, based on any of the ratio and the peaky degree; and
controlling the operating mode by any of:
adjusting the predetermined suppression amount; and
adjusting the predetermined suppression amount and the other predetermined level threshold.

17. The system of claim 10, wherein the predetermined spectrum feature comprises any of:
a ratio of signal energy in a sibilance frequency band to signal energy in the voice frequency band;
a ratio of signal energy in the sibilance frequency band to signal energy in a non-sibilance frequency band;

a ratio of signal-to-noise ratio (SNR) in the sibilance frequency band and SNR in the non-sibilance frequency band;

a spectrum centroid indicating a frequency position at which a center of mass of the spectrum is located; and a spectrum flux in the sibilance frequency band.

18. The system of claim 12, wherein the peaky degree of the sibilance spectrum is determined based on any of:

geometric mean and arithmetic mean of banded energies in the voice frequency band;

a variance of adjacent banded energies in the sibilance frequency band;

a standard deviation of adjacent banded energies in the sibilance frequency band;

a sum of differences among banded energies in the sibilance frequency band;

a maximum of differences among banded energies in the sibilance frequency band;

a crest factor of banded energies in the sibilance frequency band; and spectral entropy in the voice frequency band.

19. A non-transitory computer-readable medium storing a sequence of computing instructions, which when executed by one or more processors, causes the one or more processors to perform steps of the method according to claim 1.

* * * * *